UNITED STATES PATENT OFFICE.

JAMES D. PIERCE, OF MILWAUKEE, WISCONSIN, ASSIGNOR OF ONE-HALF HIS RIGHT TO JOHN B. SMITH, OF SAME PLACE.

IMPROVEMENT IN STENCH-TRAPS.

Specification forming part of Letters Patent No. 166,551, dated August 10, 1875; application filed June 26, 1875.

*To all whom it may concern:*

Be it known that I, JAMES D. PIERCE, of Milwaukee, in the county of Milwaukee, in the State of Wisconsin, have invented certain Improvements in Stench-Traps, of which the following is a specification:

The object of my invention is to prevent stench from rising from drains, and is a trap which is constructed so as to have the water stand in the same above the bottom of the strainer in which the slops are thrown, and the strainer constructed so as to prevent the same from being clogged.

Figure 1 is a sectional view of my invention.

A is the outside receptacle of the trap; B, the inside strainer, in which the slops are emptied; C, a crown-shaped bottom of the strainer; D, a piece of pipe setting in the outlet of the receptacle A. This piece of pipe is filled in with putty or some other plastic material, to make a tight joint round it, and extends up into the space under the crown-shaped bottom C, so that the water shall stand round the bottom of the strainer, and prevent the stench from rising from the drain. This pipe may be taken out in cold weather, so as to prevent the trap from freezing up. E, oblong openings in the strainer; F, perforations in the strainer for the purpose of allowing the liquid to strain through. These oblong openings or perforations may be used as thought best. G, outlet of the receptacle A; H, a dish formed round pipe D, which may or may not be used, as thought best. The strainer B sets on the top of receptacle A, with a flange projecting out over its top, which holds it up off of the pipe D. Dish H is made fast around pipe D, and will catch sediment, and can be taken out and the sediment emptied, the top of dish H rising above the bottom of the strainer B, so that the liquid standing in dish H above the bottom of strainer B forms a trap.

I claim—

1. A stench-trap constructed with receptacle A, strainer B, with crown-shaped bottom C, and removable pipe D, all in combination substantially as set forth.

2. Receptacle A, strainer B, with crown-shaped bottom C, removable pipe D, and dish H, all in combination substantially as specified.

JAMES D. PIERCE.

Witnesses:
J. B. SMITH,
E. J. SMITH.

J. D. PIERCE.
Fire-Proof Floors.
No. 166,552.  Patented Aug. 10, 1875.
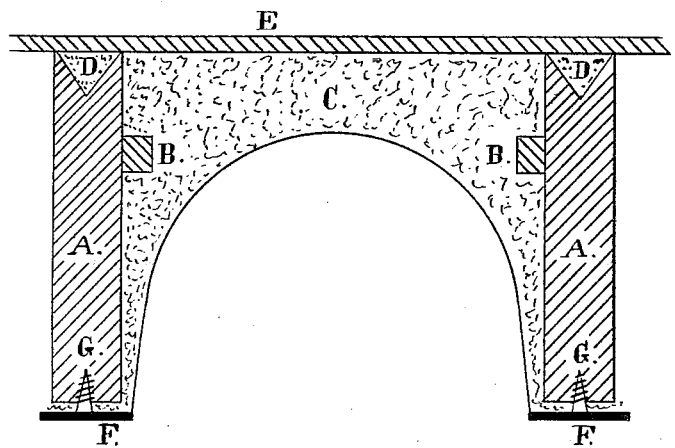
WITNESSES:
INVENTOR:
James D. Pierce